United States Patent
Upadhyay et al.

(10) Patent No.: US 8,055,287 B1
(45) Date of Patent: Nov. 8, 2011

(54) ADAPTIVE RETRY ALGORITHM FOR SHORT MESSAGE SERVICE MESSAGE DELIVERY

(75) Inventors: Piyush Upadhyay, Overland Park, KS (US); William James Routt, Leawood, KS (US); Patrick David Wilson, Denver, CO (US); Jethendranath Chalasani, Overland Park, KS (US); Iyad Saad Tarazi, Great Falls, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 482 days.

(21) Appl. No.: 12/352,966

(22) Filed: Jan. 13, 2009

(51) Int. Cl.
*H04W 4/12* (2009.01)

(52) U.S. Cl. ............ 455/466; 455/412.2; 455/453; 370/230.1

(58) Field of Classification Search .......... 455/412.1, 455/412.2, 421, 423, 424, 425, 466, 453; 370/230.1, 253, 349, 389, 395.21, 395.41
See application file for complete search history.

(56) References Cited

U.S. PATENT DOCUMENTS

| 7,069,030 B2 * | 6/2006 | Yoon ................ 455/466 |
| 2004/0171393 A1 * | 9/2004 | Harding ............. 455/466 |
| 2006/0059243 A1 * | 3/2006 | Haggard ............ 709/217 |
| 2007/0191035 A1 * | 8/2007 | Huggett ............. 455/466 |
| 2008/0182559 A1 * | 7/2008 | Pyhalammi et al. ... 455/412.1 |

* cited by examiner

*Primary Examiner* — Rafael Pérez-Gutiérrez
*Assistant Examiner* — Suhail Khan

(57) ABSTRACT

A method, system, and computer readable medium are provided to retry delivery of a short message service (SMS) message to a user's wireless device. A message delivery failure notification is received that indicates a reason for failed delivery. An amount of traffic on an SMS message delivery network is determined. A message delivery retry profile is selected based on the amount of traffic. The reason for failed message delivery may also be used in selecting the retry profile. Time intervals between retry instances of the selected retry profile may be set based on the amount of network traffic. Delivery of the message is retried according to the selected retry profile and set time intervals. Selection of a retry profile based on the amount of network traffic may provide more adaptive and optimized utilization of SMS message delivery resources.

17 Claims, 5 Drawing Sheets

ADAPTIVE RETRY ALGORITHM FOR SHORT MESSAGE SERVICE MESSAGE DELIVERY

INTRODUCTION

Short message service (SMS) is a widely used communications protocol for exchanging messages between two or more electronic devices. Typically, the devices are wireless devices configured to generate and receive SMS messages. SMS messages are short strings of text that allow users to communicate. The text strings may be limited to a maximum of 160 7-bit text characters, or less per SMS message.

SUMMARY

This summary is provided to introduce a selection of concepts in a simplified form that are further described below in the Detailed Description. This summary is not intended to identify key features or essential features of the claimed subject matter, nor is it intended to be used in isolation as an aid in determining the scope of the claimed subject matter.

Embodiments of the invention relate to methods, systems, and computer-readable media for retrying delivery of a short message service (SMS) message. An SMS message delivery failure notification is received and may indicate a reason for the failed delivery. The amount of traffic on an SMS message delivery network may then be checked and a retry profile selected based on the amount of network traffic. Delivery of the SMS message may again be attempted according to the selected retry profile.

BRIEF DESCRIPTION OF THE SEVERAL VIEWS OF THE DRAWINGS

Illustrative embodiments of the invention are described in detail below with reference to the attached drawing figures wherein.

DETAILED DESCRIPTION

Figure 1:
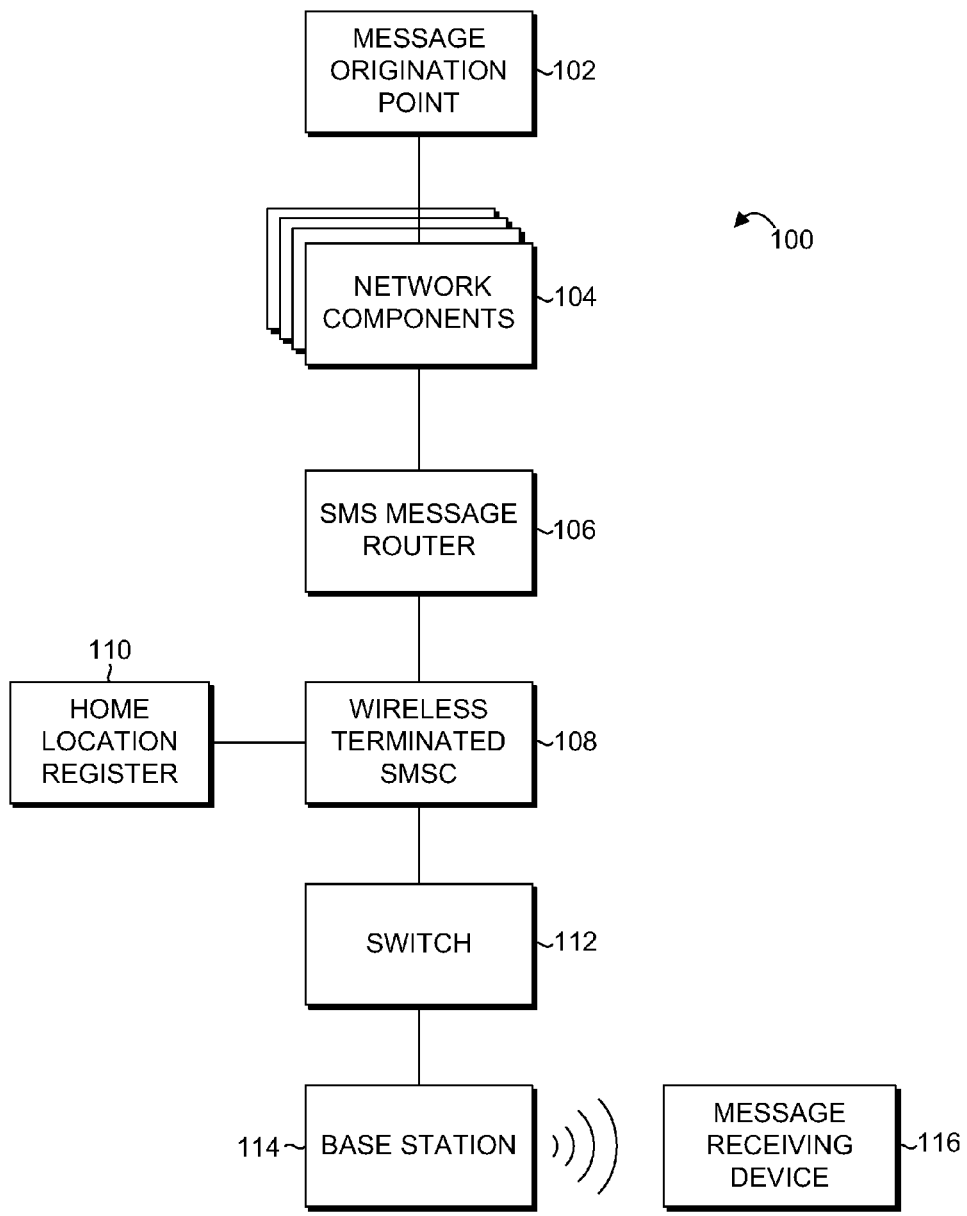
FIG. 1 is a block diagram depicting an exemplary operating environment suitable for use in implementing embodiments of the invention.

Embodiments of the invention provide computer systems, methods, and media for retrying delivery of a short message service message to a user's wireless device. Some of the wording and form of description is done so herein to meet applicable statutory requirements. Although the terms "step" or "block" might be used herein to connote different components of methods or systems employed, the terms should not be interpreted as implying any particular order among or between various steps herein disclosed unless and except when the order of individual steps is explicitly described.

Several acronyms and shorthand notations are used to aid the understanding of certain concepts pertaining to the associated system and services. These acronyms and shorthand notations are intended to help provide an easy methodology of communicating the ideas expressed herein and are not meant to limit the scope of embodiments of the invention. The following is a list of these acronyms:

| | |
|---|---|
| SMS | Short Message Service |
| SMSC | Short Message Service Center |
| WT-SMSC | Wireless Terminated Short Message Service Center |
| HLR | Home Location Register |

Embodiments of the invention may include: a method, system, or set of instructions embodied on one or more computer-readable media. Computer-readable media include both volatile and nonvolatile media, removable and non-removable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, random access memory (RAM), read-only memory (ROM), electrically erasable programmable read-only memory (EEPROM), flash memory or other memory technology, compact disc read-only memory (CD-ROM), digital versatile discs (DVD), holographic media or other optical disc storage, magnetic cassettes, magnetic tape, magnetic disk storage, and other magnetic storage devices. These technologies can store data momentarily, temporarily, or permanently.

In an embodiment of the invention, a computerized method to retry delivery of an SMS message is provided. An SMS message delivery failure notification is received. An SMS message delivery network is checked for an amount of network traffic. A message delivery retry profile is selected based on the amount of network traffic. The retry profile provides retry instances with time intervals therebetween. Delivery of the SMS message according to the selected message delivery retry profile is retried. The steps of receiving, checking, selecting and retrying may also be repeated to attempt delivery of the SMS message where initial delivery attempts are unsuccessful.

In another embodiment, a computerized system configured to retry delivery of an SMS message is provided. A receiving component is configured to receive an SMS message delivery failure notification. A traffic-determining component is configured to determine an amount of network traffic on an SMS message delivery network. A selecting component is configured to select an SMS message delivery retry profile based on the amount of network traffic. A message-delivering component is configured to deliver the SMS message to a user's wireless device according to the selected retry profile.

In yet another embodiment, computer-readable media, having instructions embodied thereon that, when executed, perform a method to retry delivery of an SMS message to a user's wireless device is provided. An SMS message delivery failure notification indicating a reason for message delivery failure is received. An SMS message delivery network is checked for an amount of network traffic. A message delivery retry profile is selected based on the amount of network traffic and the reason for message delivery failure. A retry profile includes retry instances, and a retry profile having frequent retry instances may be selected when the network traffic is lower and a retry profile having retry instances that are less frequent may be selected when the network traffic is higher. Further, time intervals between the retry instances are set based on the amount of network traffic. Shorter time intervals may be set when the network traffic is lower, and longer time intervals may be set when the network traffic is higher. Delivery of the SMS message according to the selected message delivery retry profile and the set time intervals is retried, and the steps of receiving, checking, selecting, setting, and retrying are repeated until the SMS message is delivered to a user's wireless device or for a predetermined period of time.

Having briefly described an overview of the invention, an exemplary operating environment in which various aspects of the present invention may be implemented is described below in order to provide a general context for various aspects of the invention. Referring initially to FIG. 1 an exemplary operating environment comprising a network 100 suitable for use in implementing embodiments of the invention is provided. The network 100 depicted in FIG. 1 is only one exemplary environment, of which there may be many, suitable for implementing embodiments of the invention. Further, the components depicted in FIG. 1 are depicted singularly for clarity and are provided with names for reference, but one of ordinary skill in the art will recognize that a plurality of similar components may be used in application and that the nomenclature for the components may change without distracting from the functions described herein with respect to implementation of embodiments of the invention. For example, a network may have millions of message origination points and thousands of switches and base stations. Further, the nomenclature applied to a particular component on the network 100 may change with respect to functions being performed thereby. Additionally, various other components have been excluded from the depiction of FIG. 1 for sake of clarity, but such is in no manner intended to exclude or include those components or their necessity in operation of the exemplary operating environment of FIG. 1.

With continued reference to FIG. 1, a network 100 may be described according to an embodiment of the invention. The network 100 may utilize any standards and protocols necessary for handling SMS messages, including for example but not limitation, Global System for Mobile Communications (GSM), Wideband Code Division Multiple Access (WCDMA), Freedom of Mobile Multimedia Access (FOMA), and other third generation (3G) network protocols.

Embodiments of the invention may utilize SMS message origination points 102 such as wireless and wired devices. Messages may enter the network 100 via a number of methods which are not described in detail herein, but may include, for example a message originating user wirelessly sending an SMS message from a wireless device. Alternatively, a user may send an SMS message from a wired device, such as for example a personal computer with a connection to the Internet. Upon origination, the message may be routed, transferred, and stored, among other processes, by a number of network components 104. The network components 104 may include a base station, a switch, a mobile originated short message service center, a message switching center, a network switching subsystem, and a mobile switching server.

Following, handling of the SMS message by the network components 104 the message may be transmitted to an SMS message router 106. The SMS message router 106 may receive SMS messages from various network components 104 and then route or forward the SMS messages to a desired destination. Such a destination may include a wireless terminated short message service center 108 (WT-SMSC) responsible for delivering SMS messages to the specified recipient of the SMS message.

The WT-SMSC 108 is responsible for delivery of the SMS message to a SMS message receiving device 116. The WT-SMSC 108 may query a home location register (HLR) 110 to determine the location of the receiving device 116. The HLR 110 contains a database comprising, among other things, the location of receiving device 116. The HLR 110 provides the location information to the WT-SMSC 108, thereby allowing the WT-SMSC 108 to determine proper routing for delivery of the SMS message to the receiving device 116.

The routing of the SMS message to the receiving device 116 may traverse components such as a switch 112 and a base station 114. The base station 114 may transmit the SMS message to the receiving device 116 wirelessly via radio communications technologies. The message receiving device 116 may comprise any wireless device such as for example a wireless phone, BlackBerry® device, a personal digital assistant (PDA), or a wireless enabled personal computer, among others.

Figure 2:
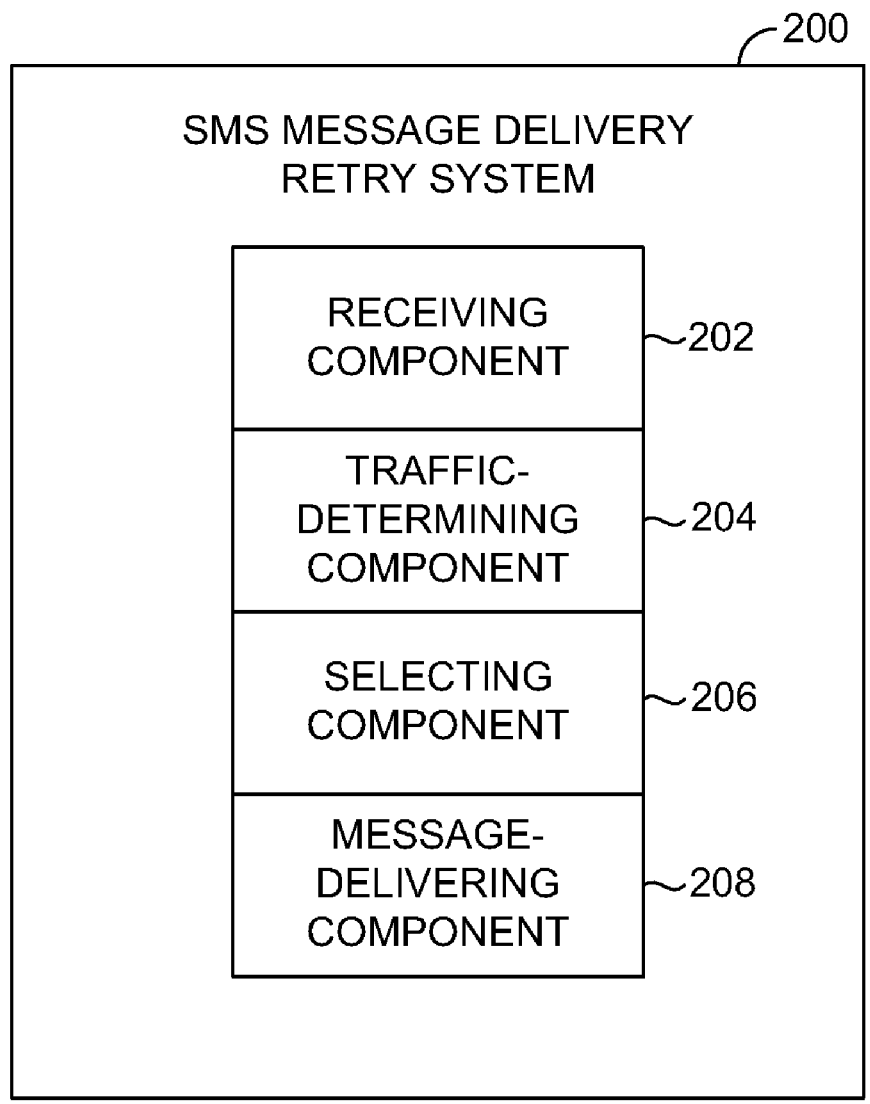
FIG. 2 is block diagram depicting a short message service delivery retry system according to embodiments of the invention.

With additional reference to FIG. 2, a block diagram is provided depicting an SMS delivery retry system 200 according to embodiments of the invention. It should be understood that this and other arrangements described herein are set forth only as examples. Other arrangements and elements (e.g., machines, components, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The system 200 may reside at the WT-SMSC 108 as described above, or other SMSC, or similar devices that are responsible for delivery of SMS messages. The system 200 may comprise a receiving component 202, a traffic-determining component 204, a selecting component 206, and a message-delivering component 208. The receiving component 202 is configured to receive SMS message delivery failure notifications. The failure notifications may be received by the system 200 at a WT-SMSC via a base station and a switch. The failure notifications provide an indication that the message was not successfully delivered and may also provide an indication of the reason for failed delivery. The failure notification may be provided to the receiving component 202 in any format or by any desired standards, methodologies, or protocol sufficient to convey the failure notification to the system 200.

It will be understood by those of ordinary skill in the art that the components 202, 204, 206, and 208 illustrated in FIG. 2 are exemplary in nature and in number and should not be construed as limiting. Any number of components may be employed to achieve the desired functionality within the scope of embodiments of the invention. In addition, one skilled in the art will appreciate that any number of components 202, 204, 206, and 208 can be implemented at a WT-SMSC or other network component, such as WT-SMSC 108 and network components 104.

An SMS message delivery failure may occur for many reasons. Such reasons may include for example, but not limitation, a receiving device being powered off, on standby, out of coverage area, out of memory, or running another application. Network conditions may also cause message delivery failures where for example an electrical storm is present in a location causing interference with wireless signals, local terrain or structures are interfering with wireless signals, or there is a network service outage, among others. Additionally, system conditions of network components may result in failed delivery of messages. Examples of such system conditions include central processing unit over-utilization, insufficient system memory for processing SMS message delivery, or over-utilization of available network bandwidth.

The traffic-determining component 204 provides a measurement function to determine the amount of traffic currently on a network. In embodiments, the traffic determining component 204 analyzes the level of current usage of SMS message delivery resources at the WT-SMSC to determine the amount of traffic. SMS message delivery resources might include network bandwidth or threads available for delivering SMS messages, processing capabilities, and memory resources. In other embodiments, the traffic measurement may be made for the network as a whole or may be limited to a specified portion of the network or component thereof.

The selecting component 206 uses the reason for SMS message delivery failure and the amount of network traffic to select an SMS message delivery retry profile. An SMS message delivery retry profile may comprise one or more retry instances having set time intervals therebetween. A retry instance occurs when a network component, such as for example a WT-SMSC, attempts to deliver an SMS message to a user's receiving device. An exemplary retry profile may have three retry instances separated by one-minute time intervals. Thus, when executing such a retry profile, the WT-SMSC, for example, would attempt to deliver the SMS message and upon receiving a failed delivery notification, would wait one minute and then attempt delivery again. The WT-SMSC would attempt delivery three times, waiting one minute between attempts.

Retry profiles may generally be designed and employed to provide a systematic approach to attempting delivery of SMS messages whose initial delivery fails. The probability of successfully delivering an SMS message may decrease over time as may the importance of successfully delivering the message. Oftentimes, SMS messages only have importance or relevance to users at and shortly after the time of origination, such as where users are having a near real time conversation or correspondence via the SMS messages. In such a situation, as time elapses after an initial failed delivery of an SMS message the importance and relevance of the message fades. This may result for many reasons such as for example, a user realizing the message delivery failed and re-sending the message again, a user ending a conversation, or an event that was the subject of a message passing. Thus, delivery of the SMS message as soon as possible may be a highly important aspect of an SMS message delivery system from customer service and quality perspectives.

Further, the design of retry profiles may also reflect the general time span in which failure conditions are rectified. Retry profiles may be designed with multiple frequent retry instances for failure conditions that resolve in a very short time. Additionally, retry profiles that have more infrequent retry instances may be designed to accommodate failure conditions that have longer durations. Examples of possible short term failure conditions might include a receiving device being in an out-of-coverage area, or running another pre-empting application. Examples of longer term failure conditions might include a receiving device being powered off, or out of memory.

Any number of different retry profiles, time intervals, and arrangements thereof may be employed. The retry profiles may have any number of retry instances, and span any desired amount of time. A group of retry profiles may be assembled having decreasing frequency of delivery attempts. Thereby, a retry profile may be selected from the group that may provide an efficient utilization of network resources in attempting delivery, or may provide subsequent delivery attempts at times providing a greater likelihood of successful delivery. Table 1, below, depicts one such exemplary retry profile.

TABLE 1

| Profile Name | Time Interval (s = second, m = minute) |
| --- | --- |
| Immediate Term | 30 s, 30 s, 60 s |
| Short Term | 15 m, 30 m |
| Medium Term | 60 m, 60 m, 60 m, 60 m |
| Long Term | 180 m, 180 m, 180 m, 180 m, 300 m |

Further, retry profiles may be static or dynamic. A static retry profile may resemble that provided in Table 1 in which a set of predetermined time intervals between retry instances is given. In a dynamic retry profile the selecting component 206 utilizes data regarding the network traffic, reason for failure, or system conditions, to compute one or more time intervals that provide the most efficient use of SMS message delivery resources and timely delivery of the SMS message.

The selecting component 206 may select a retry profile by various methods. In embodiments, selection component 206 selects retry profiles to provide the most efficient use of an SMS message delivery network and components based on current network traffic, and to optimize the rate of successful message delivery. In one embodiment, the selecting component 206 selects a retry profile based on the amount of traffic on the network. For example, if the traffic-determining component 204 determines that the amount of network traffic at the WT-SMSC is less than 1000 messages per second on a network that can process 10,000 messages per second, then the selecting component 206 may select a retry profile having very frequent retry instances, because network usage is low. Conversely, for example if the traffic-determining component 204 determined that the amount of traffic at the WT-SMSC 108 is greater than 6000 messages per second, then the selecting component may select a retry profile having less frequent retry instances.

In another embodiment, the selecting component 206 selects a retry profile based on the reason for failed message delivery and sets time intervals between retry instances based on the amount of network traffic. For example, where a message delivery failure notification is received indicating a reason for failure to be that the receiving device was out of a wireless communications network coverage area, then the selecting component 206 selects a retry profile having frequent retry instances, because such failure conditions typically have a very short duration. Additionally, the selecting component 206 may select shorter or longer time intervals between retry instances based on the amount of network traffic being lower or greater, respectively. Thus, a retry profile designed to accommodate delivery failures having short rectification periods may be selected along with time intervals designed to provide efficient utilization of network resources.

In some embodiments, the selection component 206 selects a retry profile based on both the amount of network traffic and on the reason for SMS message delivery failure. The selecting component 206 preliminarily selects a retry profile designated for a given reason for delivery failure. For example, the selecting component 206 selects a retry profile having frequent retry instances when the reason for failure is of a type that is commonly rectified in a short time. The selecting component 206 may then adjust the selected retry profile for network traffic by re-selecting a retry profile with more frequent or less frequent retry instances when the amount of network traffic is determined to be low or high, respectively. Thus, where a retry profile is selected having very frequent retry instances, but the amount of network traffic is high, then the selecting component 206 adjusts by re-selecting a different retry profile having less frequent retry instances.

For example, assume an SMS message delivery has failed due to a message-receiving device having insufficient memory space and that the current amount of traffic at a WT-SMSC is very low. The selecting component 206 preliminarily selects the "Medium Term" retry profile, as depicted in Table 1 above, because an insufficient memory space condition of a message receiving device may commonly be rectified over a period of hours. The selecting component 206 adjusts the selection of the "Medium Term" retry profile in view of the amount of traffic being very low by re-selecting the "Short Term" retry profile. Thus, delivery of the message will be retried according to the "Short Term" retry profile rather than the "Medium Term" profile. Such may be beneficial in that retry attempts will be made more frequently thereby increasing the probability of delivering the SMS message to the message-receiving device in a shorter period of time. Further, greater utilization of message delivery resources is made at a time when the resources would otherwise sit idle due to the very low amount of traffic. The selection of retry profiles and time intervals by the selecting component 206 may follow any of the above examples, and combinations thereof.

With continued reference to FIG. 2, the message-delivering component 208 attempts delivery of an SMS message to a receiving device, via a switch, base station, or any other intermediate network components. The delivery component 208 may attempt delivery by any available protocol, standard, or method employed for delivery of SMS messages. Further, the delivery component 208 may attempt delivery as directed by a selected SMS message delivery retry profile.

Figure 3:
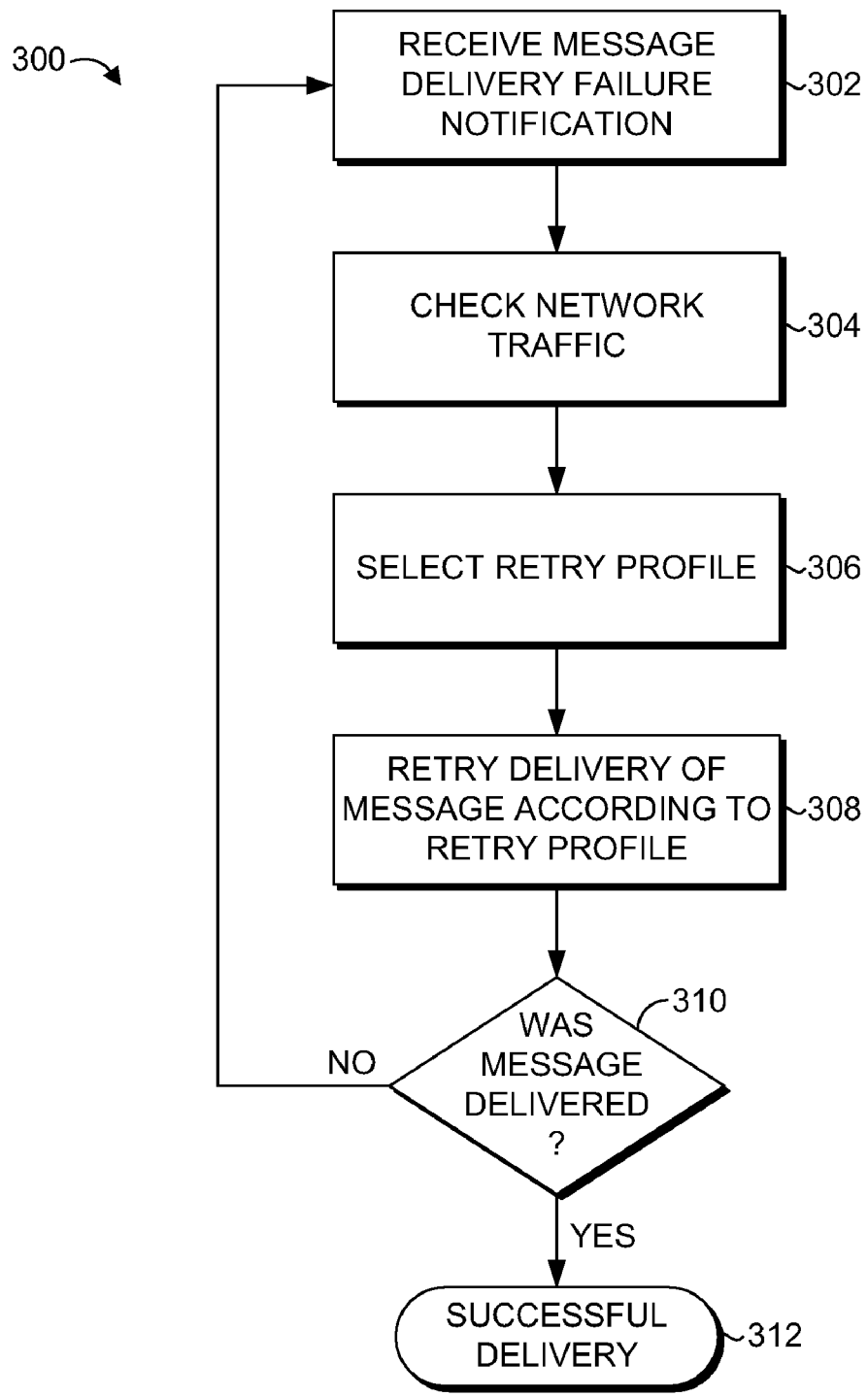
FIG. 3 is a flow diagram depicting a method for retrying delivery of a short message service message according to embodiments of the invention.

With reference now to FIG. 3, a flow diagram is provided depicting a method 300 for retrying delivery of an SMS message according to an embodiment of the invention. A message delivery failure notification is received, at 302, by a network component responsible for delivery of an SMS message, such as for example WT-SMSC 108. The amount of network traffic is checked, at 304. In turn, a retry profile is selected for retrying delivery of the SMS message to a user's message-receiving device, at 306. At 308, delivery of the SMS message to a user's message receiving device, such as message receiving device 116, is retried according to the selected retry profile. In embodiments, the delivery is retried by the WT-SMSC through the use of a home location register, a switch, and a base station such as the HLR 110, switch 112, and base station 114. Upon completion of the retry profile without successful delivery of the SMS message to the user's message-receiving device another message delivery failure notification is received by the WT-SMSC and delivery processing is returned to block 302, as depicted by block 310. If delivery of the SMS message to the user's message-receiving device is successful during the delivery attempts of the selected retry profile then the method ends, as depicted at 312. Further, upon successful delivery of the SMS message, the user's receiving device may provide visual or audible notifications to the user and may display the SMS message to the user.

Figure 4:
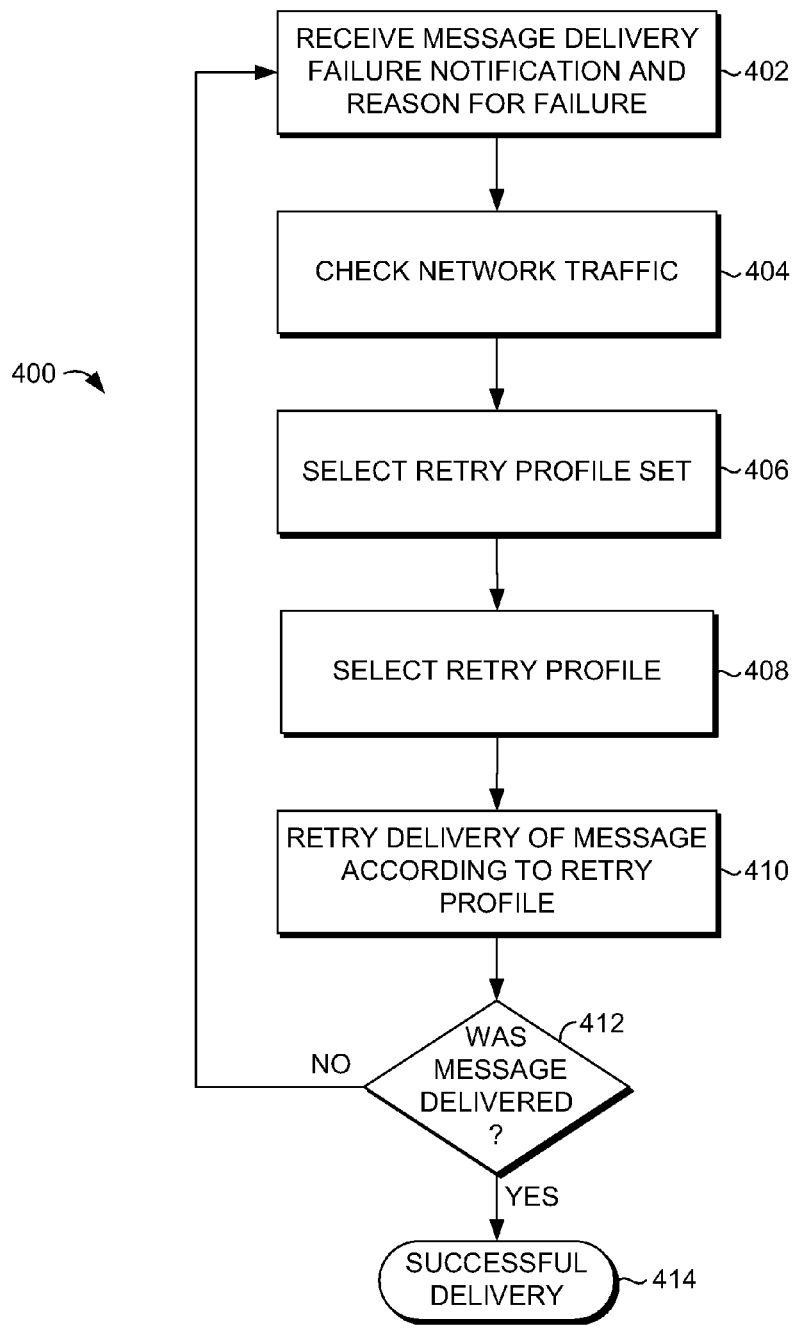
FIG. 4 is a flow diagram depicting a method for retrying delivery of a short message service message according to embodiments of the invention.

With reference now to FIG. 4, a flow diagram is provided depicting a method 400 for retrying delivery of an SMS message according to embodiments of the invention. Initially, an SMS message delivery failure notification indicating a reason for the message delivery failure is received at a WT-SMSC responsible for delivering SMS messages, such as for example the WT-SMSC 108, at 402. An SMS message delivery retry system at the WT-SMSC retries delivery by first checking the amount of network traffic at the WT-SMSC, at 404. A set of retry profiles is chosen based on the amount of network traffic, at 406. Two exemplary sets of retry profiles are depicted in Table 2, below. Groups of retry profiles may be arranged in sets, wherein each set may correspond to a range of traffic and the retry profiles therein may have time intervals designed to correspond with the range of traffic and to optimize the use of SMS message delivery network resources with respect to the amount of traffic.

TABLE 2

| Traffic Range (SMS messages per second) | Retry Profile Name | Time Intervals (s = seconds, m = minutes) |
| --- | --- | --- |
| 0-3000 | Immediate | 10 s, 10 s, 20 s |
|  | Short Term | 5 m, 10 m |
|  | Medium Term | 15 m, 30 m, 60 m |
|  | Long Term | 60 m, 60 m, 60 m |
| 3000-5000 | Immediate | 20 s, 25 s, 40 s |
|  | Short Term | 7 m, 15 m |
|  | Medium Term | 30 m, 60 m |
|  | Long Term | 120 m, 240 m, 360 m |

A retry profile is selected by the SMS message delivery retry system at the WT-SMSC from the chosen set, as depicted at 408. In embodiments, the retry profile is selected based on the reason for the failed delivery. The delivery of the SMS message is attempted according to the selected retry profile, at 410. Upon completion of the selected retry profile without successful delivery, the delivery process is returned to block 402, as depicted at 412. Conversely, upon successful delivery of the SMS message to a user's receiving device at one of the retry instances of the retry profile the process ends, at 414.

Figure 5:
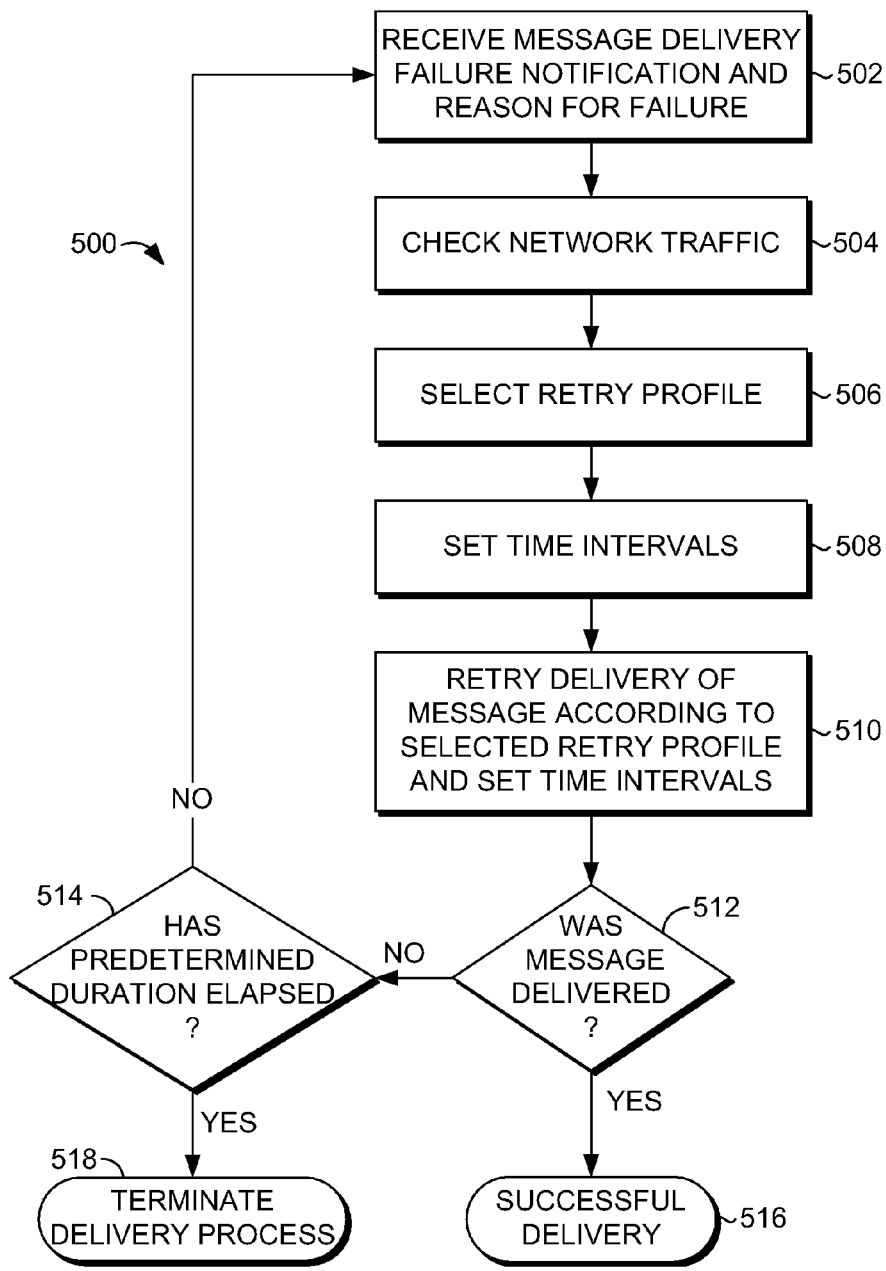
FIG. 5 is a flow diagram depicting a method for retrying delivery of a short message service message to a user's wireless device according to embodiments of the invention.

With reference now to FIG. 5, a flow diagram is provided depicting a method 500 for retrying delivery of an SMS message to a user's wireless device according to embodiments of the invention. Initially, a message delivery failure notification that includes a reason for the failed message delivery is received at a WT-SMSC, as shown at 502. The WT-SMSC checks network traffic, at 504. A retry profile is selected based on both the amount of network traffic and the reason for the failed delivery, at 506. Time intervals between retry instances of the retry profile may be set according to the amount of network traffic, at 508. Delivery of the SMS message to a user's receiving device is retried by the WT-SMSC according to the selected retry profile and set time intervals, at 510.

Upon completion of the retry profile without successful delivery of the SMS message, a message delivery failure notification is received by the WT-SMSC and delivery processing is returned to block 502, as depicted at 512. A determination may also be made at block 514 as to whether a predetermined amount of time has elapsed since an initial delivery attempt of the SMS message. The predetermined amount of time may be any desired amount of time including hours, days, weeks, months, etcetera, and sets a limit on how long the WT-SMSC will continue to retry delivery of the SMS message. In embodiments, a number of retry attempts might be employed instead of, or in addition to a predetermined amount of time. Where such a time has elapsed delivery of the SMS message may be terminated, as shown at 518.

Various other options may be available for handling delivery of the SMS message at block 518 such as notifying the message originator of the failed delivery, storing the message in memory, or re-routing the message to an undeliverable messages center, among others. Where the SMS message is successfully delivered at one of the retry instances of the retry profile the process ends at 516. The receiving user may be notified by one or more visual and audible notifications at their receiving device.

Illustrative examples of embodiments of the invention are provided below to depict several possible applications of embodiments of the invention. These illustrative examples are intended to aid in description of embodiments of the invention and not to limit the scope thereof. In a first example, an SMS message delivery failure notification is received at a WT-SMSC. An SMS message delivery retry system on the WT-SMSC checks the SMS message delivery network for the amount of traffic being processed by the WT-SMSC. The amount of traffic is measured in the number of messages processed by the WT-SMSC per second. The system then selects a retry profile based on the amount of network traffic. In this example, retry profiles like that listed in Table 3, below, may be employed and may be selected by the system based on the traffic ranges listed.

TABLE 3

| Traffic Range (messages per second) | Profile Name | Time Interval (s = second, m = minute) |
|---|---|---|
| 0-3000 | Immediate Term | 30 s, 30 s, 60 s |
| 3001-6000 | Short Term | 15 m, 30 m |
| 6001-9000 | Medium Term | 60 m, 60 m, 60 m, 60 m |
| 9001-Max | Long Term | 180 m, 180 m, 180 m, 180 m, 300 m |

Thus, if the amount of traffic is determined to be 5000 messages per second, then the system will select the "Short Term" retry profile and will retry delivery 15 minutes after the initial message delivery attempt. If the message is not successfully delivered then the system will retry the delivery again 30 minutes after the first retry. If the message is not successfully delivered after the second retry attempt then the retry profile is complete and the system will repeat the retry process by again checking the amount of traffic and selecting a retry profile based thereon. The retry profile selection is based on the traffic measurement and not on previous retry profile selections, thus the newly selected retry profile may be the same profile selected previously or may be a different retry profile.

By selecting a retry profile based on the amount of network traffic the system may optimize the efficiency and use of SMS message delivery resources. By selecting a longer term retry profiles when the network traffic is relatively high the system may spread out retry attempts over a longer period of time thereby reducing the load on the SMS message delivery resources from SMS message delivery retry attempts.

The traffic ranges, retry profile names, and time intervals provided in Table 3 (as well as Tables 1 and 2) are but examples of possible retry profiles that may be employed. It is recognized that any number of retry profiles having many different ranges of traffic, both smaller and larger, may be developed to provide a desired level of network efficiency and utilization of network resources, among other considerations.

In a second illustrative example of embodiments of the invention an SMS message delivery failure notification including a reason for the failed delivery is received at a WT-SMSC. An SMS message delivery retry system at the WT-SMSC checks the SMS message delivery network for the amount of SMS message delivery traffic at the WT-SMSC. The system selects a set of retry profiles, such as depicted in Table 2, above, based on the amount of traffic. The system selects a retry profile based on the reason for the failed delivery.

A database, or list, among others, of potential message delivery failure reasons may be created and stored on the WT-SMSC, or other network component for use by the SMS message delivery retry system. The database may designate a retry profile for use with each possible reason for message delivery failure. For example, a "Long Term" retry profile may be designated for a message delivery failure reason such as a message-receiving device being powered off, or an "Immediate Term" retry profile may be designated for an out-of-service area failure, such as shown in Table 2.

Thus, assuming the network traffic is determined to be 2500 messages per second the system chooses the set of retry profiles designated for the range of 0-3000 messages per second in Table 2. Further, assuming the reason for failed delivery is that a receiving device, such as a wireless phone, is out of connection with the network (a condition generally known to be very short in duration, especially where a user is traveling) the system selects the "Immediate Term" retry profile. The system will therefore retry delivery of the SMS message 10 seconds after the initial delivery attempt. If delivery fails again, the system will retry delivery in another 10 seconds, and again 20 seconds after that if delivery is still unsuccessful. If delivery of the message is still unsuccessful the system will again check the amount of network traffic and repeat the retry profile selection and delivery retry processes.

In yet another illustrative example of embodiments of the invention a message delivery failure notification including a reason for the message delivery failure is received by an SMS message delivery retry system at a WT-SMSC. The system retries delivery of the SMS message by first checking the amount of network traffic at the WT-SMSC. A retry profile is selected using an algorithm that considers both the amount of traffic and the reason for failure. The algorithm operates by selecting a retry profile based on the reason for failed delivery and then adjusting the profile, or re-selecting the profile based on the network traffic. The system also sets time intervals between retry instances based on the amount of traffic at the WT-SMSC. In embodiments, the retry profile selection algorithm adjusts the selected retry profile by setting the time intervals based on the amount of network traffic rather than, or in addition to re-selecting the retry profile. The time intervals may all be set equal, different, or increasing or decreasing in duration from one to the next, and may be as short as zero seconds to as long as days, months, or years, among other configurations.

By this example, a "Long Term" retry profile (see Table 1) is selected where the reason for failed message delivery is that a receiving device is powered off; a failure reason generally found to be rectified over a period of hours. Assuming that the amount of network traffic is low, the algorithm adjusts the "Long Term" retry profile by re-selecting a shorter term retry profile having more frequent retry instances, such as the "Medium Term" retry profile of Table 1. Further, the algorithm sets shorter time intervals between retry instances to further increase the frequency of retry instances while network traffic is low.

Thus, the system will retry delivery of the SMS message more frequently than would ordinarily be attempted for a failed delivery caused by a powered off device. By such a system a user who misses delivery of an SMS message because their message-receiving device is powered off but then powers the device on when the amount of network traffic is relatively low, may have the SMS message delivered in minutes instead of hours.

Conversely, if the network traffic is high the system adjusts a selected retry profile and sets time intervals to decrease the frequency of retry instances. Thereby, the system may optimize the use of network resources for delivery of SMS messages by not overloading the system with delivery retry attempts. In addition, the system reacts to changes in network traffic after completion of a retry profile by again checking the amount of traffic and selecting and adjusting a new retry profile.

It is understood that the embodiments and examples described above may be combined in whole or in part without departing from the scope of the invention. Further, one of ordinary skill in the art will also recognize that although embodiments of the invention are described herein with respect to SMS text messages, the invention may also be adapted for application to delivery retry of other media including for example, but not limitation, video, audio, and data files, among others, to receiving devices. Additionally, application of embodiments of the invention to wired communications as well as the wireless communications discussed herein is also understood under this description.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A computer-implemented method to retry delivery of a short message service (SMS) message comprising:
   receiving an SMS message delivery failure notification;
   checking an SMS message delivery network for an amount of network traffic;
   selecting a message delivery retry profile based on the amount of network traffic, wherein the retry profile provides one or more retry instances with one or more time intervals therebetween;
   setting the one or more time intervals within the selected retry profile based on the network traffic, wherein time intervals of shorter duration are set when the amount of network traffic is lower and time intervals of longer duration are set when the amount of network traffic is higher; and
   retrying delivery of an SMS message according to the selected message delivery retry profile.

2. The computer-implemented method of claim 1, wherein the steps of receiving, checking, selecting and retrying are repeated until the SMS message is delivered or for a predetermined duration.

3. The computer-implemented method of claim 1, wherein the SMS message delivery failure notification includes a reason for an SMS message delivery failure.

4. The computer-implemented method of claim 3, wherein selecting a message delivery retry profile is based on the reason for the SMS message delivery failure.

5. The computer-implemented method of claim 4, wherein the reason for the SMS message delivery failure comprises a user's device being one of: powered off, on standby, out of coverage area, out of memory, running another application, and experiencing poor network conditions.

6. The computer-implemented method of claim 1, wherein the network traffic comprises the number of SMS messages per unit of time processed by a short message service center.

7. The computer-implemented method of claim 1, further comprising repeating the steps of receiving, checking, selecting and retrying to attempt delivery of the SMS message, wherein during the step of repeating, a message delivery retry profile is selected that is different from a previously selected message delivery retry profile due to a change in the network traffic.

8. The computer-implemented method of claim 1, wherein the message delivery retry profile is selected based on the network traffic and one or more network component system conditions.

9. A computerized system for retrying delivery of a short message service (SMS) message, the system comprising, one or more computing devices having a processor and a memory and configured to provide:
   a receiving component configured to receive an SMS message delivery failure notification, wherein the message delivery failure notification comprises at least a reason for a failed SMS message delivery;
   a traffic-determining component configured to determine an amount of network traffic on an SMS message delivery network;
   a selecting component configured to select an SMS message delivery retry profile based on the amount of network traffic and the reason for failed message delivery, wherein the retry profile comprises one or more retry instances with one or more time intervals therebetween, and wherein the retry profile has more frequent retry instances when the amount of network traffic is low and less frequent retry instances when the amount of network traffic is high; and
   a message-delivering component configured to deliver the SMS message to a user's wireless device, wherein the message-delivering component attempts to deliver the SMS message according to the selected retry profile.

10. The computerized system of claim 9, wherein upon completion of the retry profile without delivery of the SMS message to the user's wireless device, the receiving component receives a delivery failure notification, the traffic-determining component determines the amount of network traffic, the selecting component selects a new retry profile, and the message-delivering component attempts delivery of the SMS message according to the selected new retry profile.

11. The computerized system of claim 10, wherein the new retry profile is the same as a previously selected retry profile or is different than a previously selected retry profile.

12. The computerized system of claim 10, wherein a number of retry profiles are executed by the message delivery component until the SMS message is delivered to the user's wireless device.

13. The computerized system of claim 10, wherein a number of retry profiles are executed by the message delivery component for a predetermined duration.

14. The computerized system of claim 9, further comprising an interval setting component, wherein the interval setting component sets one or more durations for the one or more time intervals between the one or more retry instances based on the amount of network traffic.

15. The computerized system of claim 9, wherein the amount of network traffic comprises the number of SMS messages processed by a short message service center per unit of time.

16. One or more non-transitory computer readable media, having instructions embodied thereon that, when executed, perform a method to retry delivery of a short message service (SMS) message to a user's wireless device, the method comprising:

receiving an SMS message delivery failure notification indicating at least a reason for message delivery failure;

checking an SMS message delivery network for an amount of network traffic;

selecting a message delivery retry profile based at least on the amount of network traffic and the reason for message delivery failure, wherein a retry profile comprises one or more retry instances, and wherein a retry profile having frequent retry instances is selected when the network traffic is lower and a retry profile having retry instances that are less frequent is selected when the network traffic is higher;

setting one or more time intervals between one or more retry instances of the selected retry profile based on the amount of network traffic, wherein shorter time intervals are set when the network traffic is lower, and longer time intervals are set when the network traffic is higher; and retrying delivery of an SMS message according to the selected message delivery retry profile and the set one or more time intervals.

17. The non-transitory computer readable media of claim 16, further comprising repeating the steps of receiving, checking, selecting, setting, and retrying until the SMS message is delivered to a user's wireless device or for a predetermined duration, wherein during the step of repeating, the retry profile that is selected and the time intervals that are set are the same or different from the retry profile that was selected and the time intervals that were set previously.

* * * * *